United States Patent [19]

Williams

[11] Patent Number: 4,528,804

[45] Date of Patent: Jul. 16, 1985

[54] SENSING UNIT FOR ROW CROP HARVESTER GUIDANCE SYSTEM

[75] Inventor: Terry A. Williams, Batavia, Iowa

[73] Assignee: Deere & Company, Moline, Ill.

[21] Appl. No.: 529,428

[22] Filed: Sep. 6, 1983

[51] Int. Cl.³ .............................................. A01D 75/14
[52] U.S. Cl. ............................... 56/10.2; 56/DIG. 15; 180/79.1; 280/776
[58] Field of Search ...................... 56/10.2, 14.9, 15.1, 56/15.2, 15.3, 15.4, 15.5, DIG. 15; 180/79.1, 131, 132; 104/244.1; 280/776; 174/66, 67; 267/155, 174, 177

[56]  References Cited

U.S. PATENT DOCUMENTS

| | | | |
|---|---|---|---|
| 434,274 | 8/1890 | Howard | 267/155 |
| 3,283,062 | 11/1966 | D'Entremont | 174/66 |
| 3,791,117 | 2/1974 | Lawrence | 56/98 |
| 3,857,455 | 12/1974 | Ernst | 56/10.2 |
| 4,115,983 | 9/1978 | Barnes et al. | 56/98 |
| 4,166,349 | 9/1979 | Coenenberg et al. | 56/10.2 |
| 4,259,831 | 4/1981 | Jerke et al. | 56/98 |
| 4,295,323 | 10/1981 | Maier et al. | 56/10.2 |

OTHER PUBLICATIONS

"The First Serial Produced Automatic Steering System for Corn Combines and Forage Harvesters", Busse et al., 1978, ASAE, 1-78, pp. 43-47.
"Spare Parts List" for Claas-Lenkautomat, Apr. 1977.
"Information" Claas-Lenkautomat, May 24, 1976.
"Selbstfahrende Feldhacksler SFH3008, SFH3008A, SFH4010, SFH4010A".
"Autopilot fur Mahdrescher und Selbstfahrende Hacksler".

Primary Examiner—Gene Mancene
Assistant Examiner—David I. Tarnoff

[57] ABSTRACT

A sensing unit for a row crop harvester guidance system is attached to a row crop harvester header. The header includes first and second crop dividers. Each divider has a pair of sidewalls. A crop receiving passageway is formed between the dividers. The unit comprises a rotatably mounted crop engaging arm biased into a crop engaging position by a torsion spring. In the crop engaging position the arm projects outwardly from one sidewall of one of the dividers into the passageway. The spring tension is adjustable to vary the amount of force required to actuate the crop engaging arm. Variation in the force is desirable to permit the sensing unit to operate reliably in a variety of crop and field conditions. Rotation of the crop engaging arm is limited by a shock absorbing guide movable in a slot in the sensing unit frame. The sensing unit has a housing for shielding critical components mounted on the unit from exposure to dirt and debris. The housing is readily removable from the confines of the divider to expose the components for servicing.

7 Claims, 8 Drawing Figures

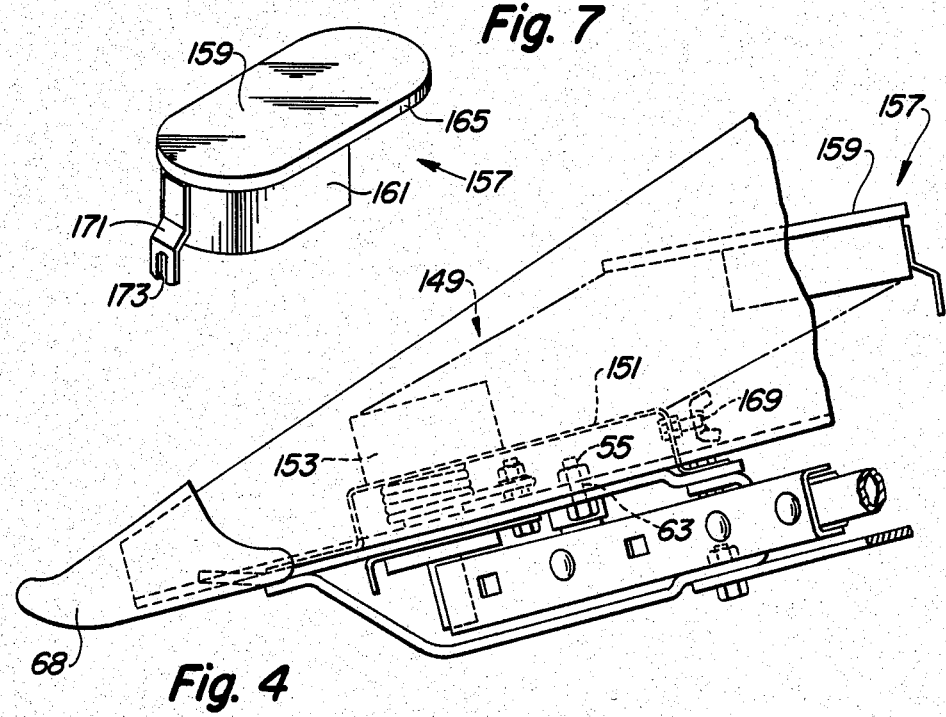
Fig. 7
Fig. 4
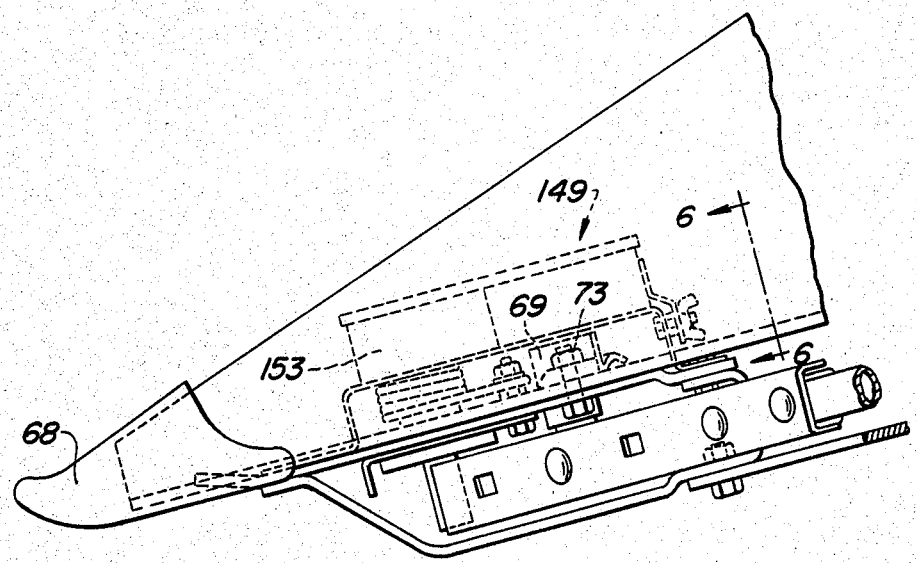
Fig. 5

SENSING UNIT FOR ROW CROP HARVESTER GUIDANCE SYSTEM

CROSS REFERENCE TO RELATED APPLICATIONS

U.S. patent application Ser. No. 529,427 filed simultaneously herewith, in the names of deBuhr et al, entitled RETROFITTABLE SENSING UNIT FOR ROW CROP HARVESTER GUIDANCE SYSTEM and assigned to the assignee of the invention herein is directed to a sensing unit for a row crop harvester guidance system which is simply attachable and retrofittable to harvester headers having different sizes and corresponding to different row spacings. The invention disclosed and claimed in application Ser. No. 529,428 is disclosed herein in section II solely for the purpose of completeness of description of the operative environment of the invention claimed herein and thus forms no part of the invention claimed herein.

U.S. patent application Ser. No. 529,426 filed simultaneously herewith in the name of deBuhr, entitled LOCKOUT POSITIONABLE SENSING UNIT FOR ROW CROP HARVESTER GUIDANCE SYSTEM and assigned to the assignee of the invention herein is directed to a sensing unit for a row crop harvester guidance system with the crop engaging arm of the sensing unit having a lockout position. The invention disclosed and claimed in this application Ser. No. 529,426 is disclosed herein in section IV solely for the purpose of completeness of description of the operative environment of the invention claimed herein and thus forms no part of the invention claimed herein.

U.S. patent application Ser. No. 529,429 filed concurrently herewith in the name of Demorest, entitled ROW CROP HARVESTER GUIDANCE SYSTEM CONTROL CIRCUIT and assigned to the assignee of the invention herein is directed to a control circuit for operatively connecting the sensing unit of a row crop guidance system to a hydraulic cylinder for automatically controlling the tongue position of a pull type harvester. The invention disclosed and claimed in this application Ser. No. 529,429 is disclosed herein in sections VI and VII solely for the purpose of completeness of description of the operative environment of the invention claimed herein and thus forms no part of the invention claimed herein.

BACKGROUND OF THE INVENTION

This invention relates to a row crop guidance system for maintaining the alignment of a pull type forage harvester with the crop rows being harvested. More particularly, the invention relates to the internal construction of a sensing unit for such a row crop harvester guidance system.

One type of commercially available pull type forage harvester which is used to harvest a variety of row crops such as corn, sorghum, sugar cane and the like includes a base unit and an attached header. The base unit/header combination is towed through a field with a tractor. In the harvesting mode, the harvester is positioned outboard of the tractor by operation of a hydraulic cylinder connected to the tongue of the harvester so that the towing tractor does not have to ride over the crop prior to harvesting. When harvesting, the operator must look behind himself frequently to maintain the alignment of the harvester with the crop rows being harvested. After initially aligning the tractor and harvester properly relative to the crop rows, alignment is usually maintained by steering the tractor. However, the requirement for the operator to look over his shoulder frequently at the harvester leads to operator fatigue. When not in use, the harvester is also positionable behind the tractor for transport.

To reduce operator fatigue and to simplify the harvesting operation, it has been proposed to provide a guidance system for automatically maintaining the alignment of a pull type harvester with crop rows being harvested by physically sensing the location of the crop row relative to the harvester. One proposal is disclosed in U.S. Pat. No. 4,295,323. One problem in the design of such systems is that the system must provide reliable operation under a variety of crop and field conditions including good standing and down crop conditions, straight and contour rows, clean or weed and grass infested fields, smooth to very rocky fields, wet and muddy fields and hilly and level fields. In addition, stalk strengths vary with the type of crop and crops of the same type have varying stalk strengths due to exposure to different growing conditions including factors such as moisture level, amount of fertilizer used, cultivation practices and thickness of planting.

SUMMARY OF THE INVENTION

Accordingly, it is an object of this invention to provide a row crop guidance system for automatically maintaining alignment of a harvester with a crop row.

Another object of the invention is to provide such a system which will operate reliably in a variety of different crop and field conditions.

Another object of the invention is to provide a sensing unit for a row crop guidance system which is adjustable for different crop and field conditions.

Still another object of this invention is to provide a sensing unit for a row guidance system, which unit has a housing for shielding critical components mounted on the unit from exposure to dirt and debris. The shielding should be readily removable to expose the components for servicing.

These and other objects of the invention, which will be apparent from consideration of the following detailed description and accompanying claims, are accomplished by a sensing unit for a row crop harvester guidance system in the following manner. The unit is attachable to the header of a row crop harvester. A preferred harvester header for use with the sensing unit comprises first and second dividers. Each divider has a pair of sidewalls. A crop receiving passageway is defined between one of the sidewalls of the first divider and one of the sidewalls of the second divider. The unit comprises a rotatably mounted crop engaging arm. In accordance with the features of a preferred embodiment of the invention, a torsion spring biases the arm into a crop engaging position in which it projects outwardly from one sidewall of the first divider into the passageway. The spring has one end fixed to the frame of the sensing unit and the other end fixed to the crop engaging arm. The crop engaging arm is rotatably mounted in the frame on a shaft. A collar surrounds the shaft and is adjustable to vary the tension in the spring. Variation in spring tension varies the amount of force required to actuate the crop engaging arm. The force to actuate the arm should be as high as possible to avoid actuation by any foreign matter, yet low enough not to push over the crop stalk which is being sensed.

In accordance with another feature of the invention, rotation of the crop engaging arm is limited by a shock absorbing guide movable in a slot in the frame. The guide includes inner and outer nonresilient liners and an intermediate resilient liner. This construction provides resiliency and durability.

In accordance with still another feature of the invention a housing is provided for a sensor switch which is used to convert the mechanical signal generated by the crop engaging arm into an electrical signal. The housing fits within the available space within the divider and is easily removable to permit access to the switch for adjustment.

BRIEF DESCRIPTION OF THE DRAWINGS

FIG. 4 is a side, elevational view of the harvester divider and sensing unit of FIG. 1 taken along lines 4—4.

FIG. 5 is a side, elevational view similar to FIG. 4 and showing an alternate embodiment of a sensing unit for a row crop guidance system.

FIG. 7 is a perspective view of a housing cover for the sensing unit shown in FIG. 4.

DESCRIPTION OF THE PREFERRED EMBODIMENTS

Such terms as forward, rearward, vertical, horizontal and lateral are used for convenience and are determined by reference to the machine in its standard operating position and relative to the direction of forward travel. The terms left and right are determined by standing at the rear of the machine and facing in the direction of travel.

I. GENERAL

Figure 1:
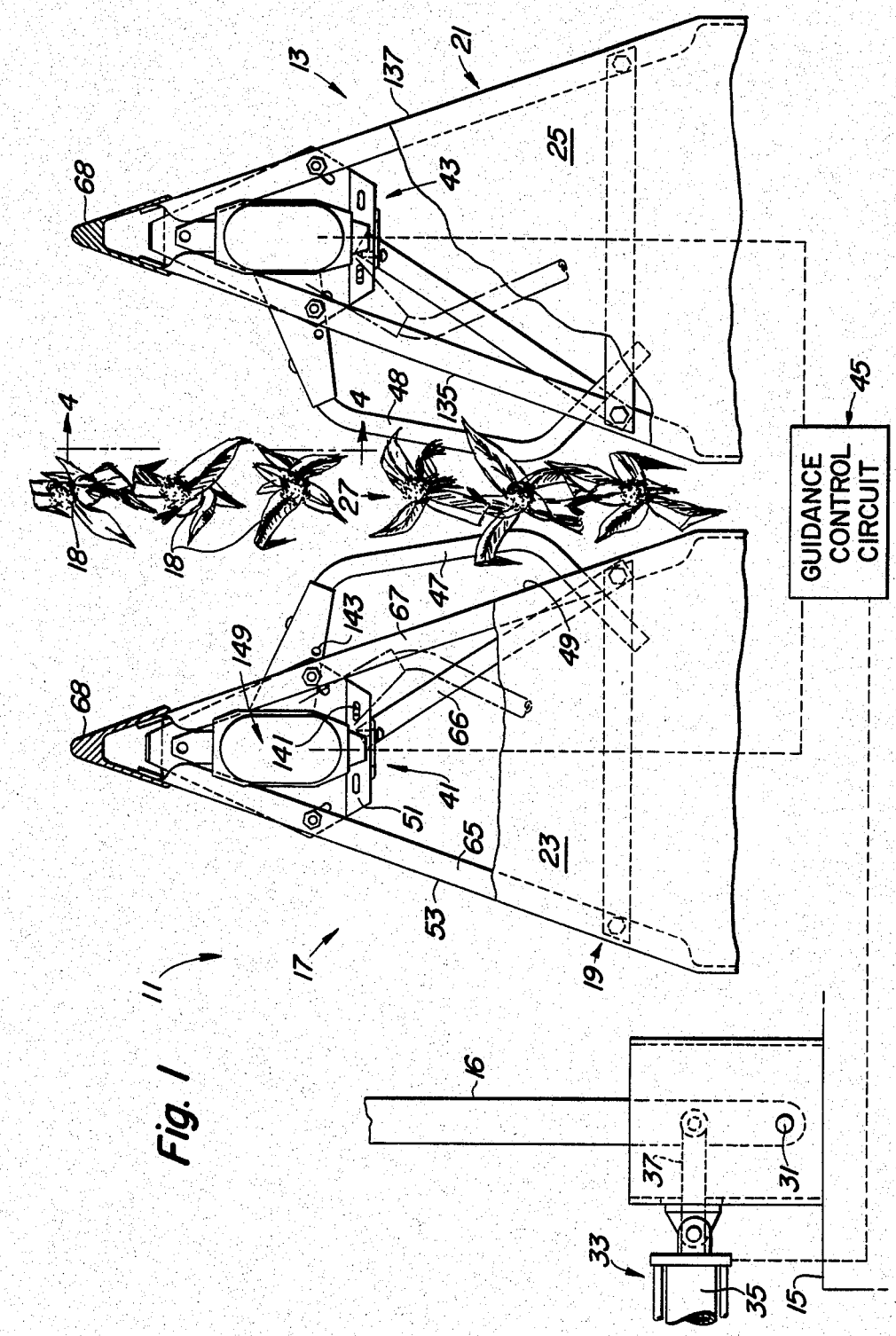
FIG. 1 is a fragmentary, schematic view of a pull type forage harvester incorporating a sensing unit for a row crop harvester guidance system in accordance with the features of this invention.

Reference is now made to FIG. 1 of the drawings which illustrates in fragmentary and schematic form a towed row crop harvester 11 with a guidance system 13, in accordance with the invention herein, installed thereon. The harvester 11 is comprised of a base unit 15 and a header 17 which are used to harvest a variety of row crops such as corn, sorghum, sugar cane and the like. Guidance system 13 automatically senses the location of harvester 11 relative to a crop row 18 and maintains harvester 11 properly aligned with crop row 18 for harvesting. Header 17 is detachably mounted on the base unit 15 via a conventional attaching bracket, for example, such as shown in U.S. Pat. No. 3,791,117, the disclosure of which is hereby incorporated by reference herein. The header, except for components of the guidance system, is conventional and may be, for example, a three-row, row crop header such as shown in U.S. Pat. No. 3,791,117 and manufactured by Deere & Company, Moline, Ill. for its Models 3940 and 3960 forage harvesters. It will be recognized by those skilled in the art that this invention has equal applicability to headers for harvesting two or more rows of crop. By way of further example, the invention herein is equally applicable to headers such as disclosed in U.S. Pat. No. 4,259,831 and U.S. Pat. No. 4,115,983. Header 17 comprises four transversely spaced, side-by-side, generally fore-and-aft, rearwardly converging, downwardly and forwardly inclined crop dividers. For simplicity, the first and fourth dividers are not shown and only the second divider 19 and the third divider 21 to which the components of the guidance system 13 are attached are shown. (The dividers are numbered by counting left to right in FIG. 1). Crop dividers 19, 21 include fenders 23, 25 respectively, (shown partially broken away), which terminate in points. The space between each crop divider 19, 21 form a generally fore-and-aft crop receiving passageway 27. Similarly, other passageways (not shown) are formed between the first divider (not shown) and second divider 19 and between the third divider 21 and fourth divider.

As is well known, the points of the dividers ride along the ground between rows of standing crop to separate down and entangled crop as the base unit/header combination is towed through the field. The fenders present smooth upper surfaces which allow the crop to slide rearwardly along the top surface of the fenders through an opening (not shown) in a rear attachment frame (not shown) of header 17 and into a throat (not shown) of base unit 15. Crop entering through the throat passes between feed rolls (not shown) in the base unit 15 which feed the crop over a shear bar (not shown) to a cylindrical cutter head (not shown) for cutting the crop in small pieces.

Base unit 15, except for components of the guidance system 13 which are attached thereto, is conventional and may be a model 3940 or 3960 harvester base unit manufactured by Deere & Company, Moline, Ill. The harvester base unit 15 is towed by a tongue 16 mounted to the frame of the base unit on a pivot 31. The angular position of tongue 16 about pivot 31 and the trailing position of harvester 11 behind a towing tractor (not shown) are controllable via a double acting hydraulic cylinder 33. Cylinder 33 includes a housing 35 fixed to the frame of base unit 15 and a piston rod 37 pivotally mounted to tongue 16.

Guidance system 13 automatically operates cylinder 33 to maintain the alignment of header passageways 27 with the crop row 18 being harvested. By using guidance system 13 to maintain alignment of passageway 27 with crop row 18, the alignment of the rows of crop immediately adjacent row 18 on the left and right is maintained with the passageways (not shown) formed between the first divider and second divider 19 and between the third divider 21 and the fourth divider (not shown). Guidance system 13 includes a pair of row crop sensing units 41, 43 mounted respectively on dividers 19, 21 and a guidance control circuit 45 connected between units 41, 43 and hydraulic cylinder 33. Units 41, 43 sense the deviation of row 18 from the longitudinal axis of passageway 27 and generate a mechanical signal indicative thereof. Circuit 45 converts the mechanical signal from units 41, 43 into an electrical signal for controlling the operation of cylinder 33 to maintain such deviation within an acceptable range.

II. ROW CROP SENSING UNIT ATTACHMENT

The row crop sensing units 41, 43 can be simply attached to the points of dividers 19, 21. Such dividers are commonly commercially available in at least two sizes. One size corresponds to a header designed for harvesting row crops with a 76.2 cm (30 inch) row spacing. Another size corresponds to a header designed for harvesting row crops with a 96.52 cm (38 inch) row spacing. Units 41, 43 are easily retrofitted onto commercially available headers of different sizes.

Reference is now made to FIGS. 1–4 which illustrate in detail a preferred embodiment of the sensing unit 41 which is simply attachable and retrofittable on divider points. Unit 41 comprises (1) a rotatably mounted crop engaging arm 47, (2) means for biasing arm 47 into a crop engaging position wherein arm 47 projects outwardly from a right sidewall 49 into passageway 27 and (3) a frame member or plate 51 in which arm 47 is rotatably supported. Frame member 51 spans between and is fixed to right sidewall 49 and a left sidewall 53. Frame member 51 is fixed to sidewalls 49, 53 via a pair of bolts 55, 57 inserted through respectively slots 59, 61 in plate 51 and holes 63 (FIG. 4, only one shown) in left flange 65 and right flange 67. Slots 59, 61 permit frame member 51 to be attached to dividers having a range of spacings between sidewalls 49, 53 as is commonly found for headers designed for different row crop spacings. The means for affixing frame member 51 in divider 19 further includes the formation of frame member 51 with a pair of forwardly converging edges 76, 78 receivable within a divider tip 68 fitted on the forwardly converging end of divider sidewalls 49, 53. Support of unit 41 in divider 19 is further aided by a brace 66 attached to right sidewall 49. Thus, in order to attach unit 41 to divider 19, only minor modifications of divider 19 are necessary. One hole (i.e. hole 63) is drilled in each flange 65, 67. Also, the mounting of the divider points to the header must be enhanced to aid in supporting the additional weight of unit 41.

Figure 6:
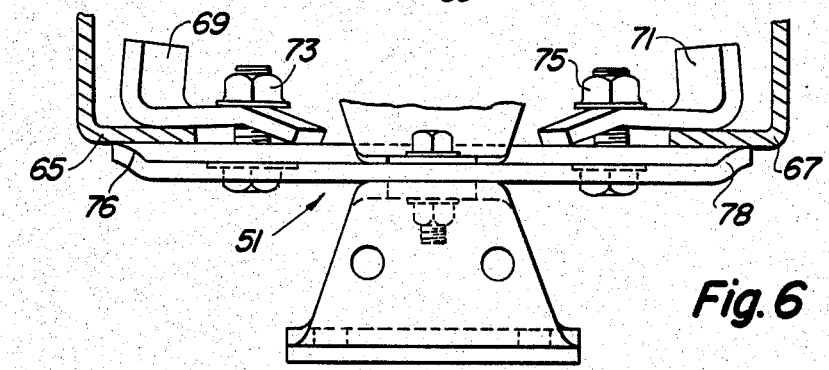
FIG. 6 is a cross-sectional view of the sensing unit of FIG. 5 taken along lines 6—6.

An alternate embodiment of the means for affixing frame member 51 and divider 19 is shown in FIGS. 5 and 6. Identical components in each of the embodiments are identified by the same number. In accordance with this embodiment, the affixing means includes a pair of clamping plates 69, 71 bolted to frame member 51 via bolts 73, 75 inserted through a pair of slotted openings in plate 51 (not shown, but identical to slots 59, 61 shown in FIG. 2). Attachment is accomplished by sandwiching sidewall flange 65 between clamping plate 69 and edge 76 of plate 51 and sandwiching sidewall flange 67 between clamping plate 71 and edge 78 of plate 51. As in the embodiment shown in FIG. 2 the converging edges 76, 78 are inserted into the divider tip 68. As will be apparent the embodiment shown in FIGS. 5, 6, is identical to the embodiment shown in FIGS. 1 through 4 except that the provision of clamping plate 69, 71 eliminates the necessity of drilling bolt holes 63 (only one shown) in flanges 65, 67, thereby further simplifying the attachment procedure.

Row crop sensing units 41, 43 are essentially identical except that unit 41 is designed for operation on the left side of passageway 27 and unit 43 is designed for operation on the right side of the passageway 27. Thus, the only differences in construction are associated with the location of arms 47, 48. Therefore, a detailed explanation of the structure of unit 43 is deemed to be unwarranted.

III. MOUNTING FOR CROP ENGAGING ARM

Figure 2:
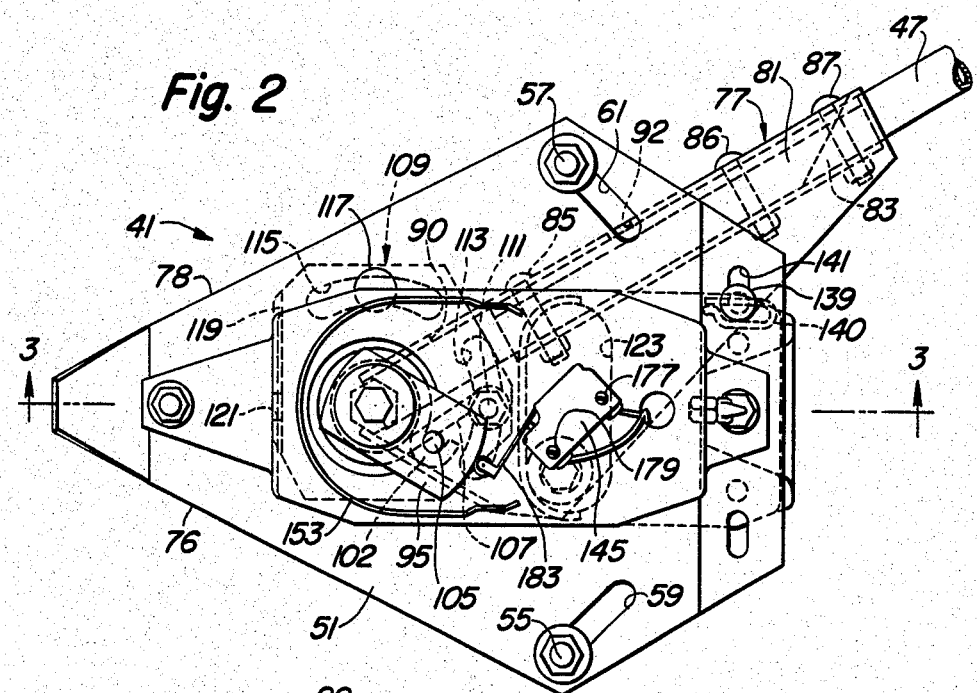
FIG. 2 is a fragmentary, plan view (with parts omitted for clarity) of one of the sensing units shown in FIG. 1.
Figure 3:
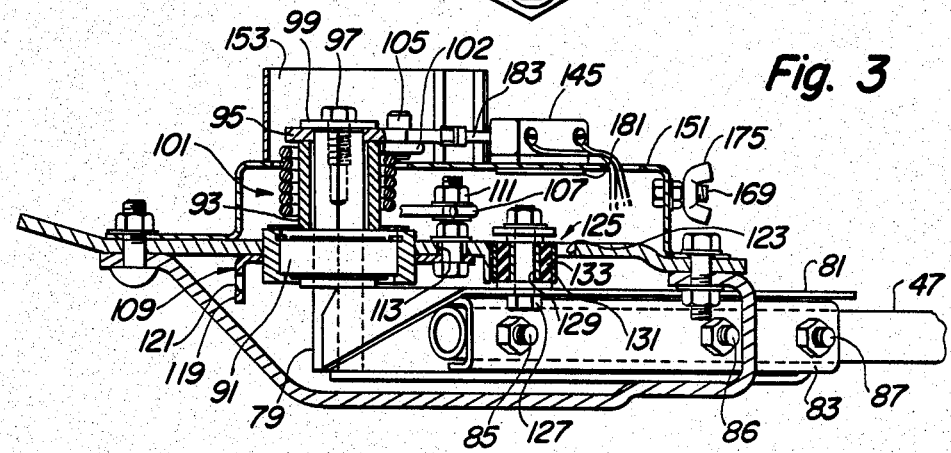
FIG. 3 is a cross-sectional view of the sensing unit shown in FIG. 2 taken along lines 3—3.

Reference is now made primarily to FIGS. 2 through 4 which illustrate a preferred embodiment of the mounting for crop engaging arm 47 of unit 41 in accordance with the invention herein.

Arm 47 is adjustably fixed in an arm support 77, which forms an extension of the arm and includes an integral hex shaft 79 rotatably supported in frame member 51. Support 77 includes a pair of mating channels 81, 83 for receiving and rigidly holding one end of arm 47 with a plurality of bolts 85–87. A plurality of additional holes 90, 92 are provided in channel 81 to permit the extension of arm from channels 81, 83 to be adjustable. This permits the length of arm 47 to be adjusted for adaptability of the row crop sensing unit to headers designed for different row crop spacings. Arms 47, 48 are preferably spaced apart about 10 to 14 cm regardless of the header size. Shaft 79 is rotatably supported in plate 51 via (1) a hex shaft bearing 91, (2) a spacer 93 coaxially surrounding shaft 79 and (3) a switch actuator plate 95 fixed to shaft 79 with a bolt 97 and washer 99. Plate 95 operates a switch in guidance control circuit 45 in response to movement of arm 47. Arm 47 is biased into a crop engaging position wherein arm 47 projects outwardly from sidewall 49 into passageway 27 via a torsion spring 101. Spring 101 has one end 102 fixed to a pin 105 on actuator plate 95 and the other end 107 fixed to an adjustable collar 109 via a bolt 111 extending through a slot 113 in plate 51. Bolt 111 is rigid with collar 109 and is adjusted so as to be freely movable in slot 113. The collar 109 is adjustable about the axis of shaft 79 to permit the bias of spring 101 to be adjusted via a slot 115 in collar 109 and a bolt 117 rigidly fixed in plate 51 and extending through slot 115. The bolt end extending through slot 115 is provided with a nut which may be loosened to permit adjustment of collar 109 and tightened to retain collar 109 in the adjusted position. Collar 109 has a flange 119 with an opening 121 for receiving a tool such as a screw driver to rotate collar 109 about the axis of shaft 79 and adjust the tension on spring 101. Opening 121 is accessible to engagement with a tool from the left rear of unit 41. Adjustment of the tension or bias of spring 101 adjusts the force required to move crop engaging arm 47. Variation of the force is desirable because of the differing requirements to harvest in different crop and field conditions and to provide reliable actuation of arm 47 responsive to movement only by a row of crop stalks, but not by other plants such as weeds or grass. The force required to actuate arm 47 should be as high as possible to avoid actuation of the arm by foreign matter such as weeds, yet low enough not to push over the row of crop stalks which is to be sensed. Stalk strength varies with the type of crop and crops of the same type will have varying stalk strengths due to exposure to different growing conditions including factors such as moisture level, amount of fertilizer used, cultivation practices, and thickness of planting.

In accordance with another feature of this invention, the rotation of arm 47 is limited by a shock absorbing guide 125 fixed to arm support 77 and movable in a slot 123 in plate 51. Guide 125 includes (1) a shaft or a bolt 127 in channel 81, (2) inner and outer nonresilient liners 129, 131 (preferably metal) and (3) an intermediate resilient liner 133 (preferably rubber). The inner, outer and intermediate liners 129, 131, 133 are mounted coaxially of shaft 127. Slot 123 is sized to permit arm 47 to assume in the unactuated position a crop engaging position in passageway 29, to recede completely under divider 19 if an obstruction is hit and then to spring back into the operating position. By arm 47 being able to completely recede under divider 19 helps to prevent or reduce the amount of damage incurred by unit 41 if a major obstruction such as a rock or fence post is hit by arm 47. Guide 125 provides a long lasting shock absorber for movement of arm 47, particularly when arm 47 is required to swing through its full range of travel following impact with an obstacle or even a crop stalk. The sandwiching of rubber between metal provides resiliency and durability.

In accordance with another feature of this invention, arm 47 is shaped to help prevent material from hanging thereon, particularly when it is necessary to back up when harvesting. First, arm 47 has a continuous portion (FIG. 1) extending (a) outwardly of sidewall 49, (b) along passageway 27 and (c) then inwardly of sidewall 49. Secondly, the rear end of arm 47 extends inwardly under divider 19 between flange 67 and bar 66 which shield material from the rear end of arm 47.

IV. CROP ENGAGING ARM LOCKOUT POSITION

Crop engaging arms 47, 48 of row crop sensing units 41, 43 respectively are movable between the crop engaging position shown in full lines in FIG. 1 and a lockout or inoperative position shown in dotted lines in FIG. 1. In the crop engaging position arms 47, 48 project outwardly from right sidewall 49 of divider 19 and from a left sidewall 135 of divider 21 respectively into passageway 27. In the lockout position, arm 47 is entirely under divider 19 between sidewalls 49, 53 and arm 48 is entirely under divider 21 between sidewalls 135, 137. Referring to FIG. 2, arm 47 may be retained in the lockout position by a pin 139 inserted through a slot 141 in plate 51 and a hole 143 (FIG. 1) in arm support channel 81. Slot 141 and hole 143 are aligned when arm 47 is in the lockout position permitting pin 139 to be inserted therethrough. A locking pin 140 holds pin 139 in position. An identical pin, hole and slot arrangement is provided in unit 43. Other means for retaining arms 47, 48 in a lockout position will be apparent to those skilled in the art.

The capability to position arms 47, 48 into a lockout position has been found to be desirable when reliable operation of the guidance system is not possible because of crop or field conditions. For example, reliable operation may not be possible (1) when weeds are encountered in a crop being harvested, (2) when harvesting a broadcast planted crop and (3) when harvesting a crop in which there has been a substantial amount of crop regrowth from a prior year. Also, it may be desirable to lock out arms 47, 48 when the guidance control system is malfunctioning, thereby avoiding or reducing the risk of further damage to the system. Thus, when use of the guidance system 13 is not desirable, the arms 47, 48 may be safely stored in the lockout position and removal of units 41, 43 is unnecessary. When the guidance system is locked out, the operator steers or guides the tractor and harvester independently of the guidance system.

V. SENSOR SWITCH HOUSING

Guidance control circuit 45 includes a pair of electrical switches for 145, 147 (FIGS. 2, 8) for detecting the movement of arms 47, 48 respectively. Referring to FIGS. 2 and 4, in order to shield switch 145 and the upper end of shaft 79 containing actuator plate 95, a housing or enclosure 149 is provided in accordance with another feature of this invention. A cover 157 (FIG. 7) for housing 149 is omitted for clarity in FIG. 2. It is also necessary that housing 149 permit access by the operator to allow adjustment of switches 145, 147. Switches 145, 147 are adjustable so that the amount of movement of arms 47, 48 necessary to actuate switches 145, 147 may be set. Housing 149 includes (1) a floor 151 on which switch 145 is adjustably positioned, (2) a wall 153 fixed to floor 151 and surrounding a portion of floor 151, (3) a cover 157 including a roof 159 and a second wall 161 fixed to roof 159 and surrounding a portion of roof 159, and (4) a fastener 167 for retaining cover 157 in place. Cover 157 fits over wall 153 with the exposed end of walls 153, 161 engaged and with the second wall 161 resting on floor 151, thereby providing a complete enclosure for switch 145 and the upper end of pivot shaft 79 having actuator arm 95 mounted thereon. Roof 159 further includes an exposed flange 165 which extends around the exterior of the upper edge of wall 153 to provide a defined seating relationship of cover 157 on wall 153. Fastener 167 includes a bolt 169 fixed to floor 151 and a strap 171 fixed to cover 157 and having an open ended slot 173 engageable around the bolt 169. Bolt 169 has a wing nut 175 threaded thereon for firmly attaching strap 171 to bolt 169.

Switch 145 is adjustably positioned on floor 151 by way of a pair of screws mounted through switch 145 and extending through slotted openings (not shown) in floor 151. Screws 177, 179 are screwed into a plate 181 beneath floor 151. Switch 145 is adjustably positioned to enable the point at which switch 145 is opened and closed by movement of arm 47 to be set. FIG. 2 illustrates switch 145 in the closed position with a switch follower 183 engaged with one end of actuator plate 95. In the open position, follower 183 is engaged with the left side of actuator plate 95.

Housing 149 must fit within the available space within fender 23 of divider 19 and be easily removeable to permit access to switch 145 for adjustment. As may be seen in FIG. 4, to remove cover 157, first wing nut 175 is loosened, second cover 157 is moved upwardly to disengage flange 165 from wall 161, and then cover 157 may be moved rearwardly to expose switch 145. By having wall 161 fixed to floor 151 and by having wall 153 fixed to cover 165, it is possible to provide a durable and rigid enclosure for switch 145 and at the same time provide easy access to and exposure of switch 145 to the operator when adjustment of switch 145 is necessary.

VI. GUIDANCE CONTROL CIRCUIT

Figure 8:
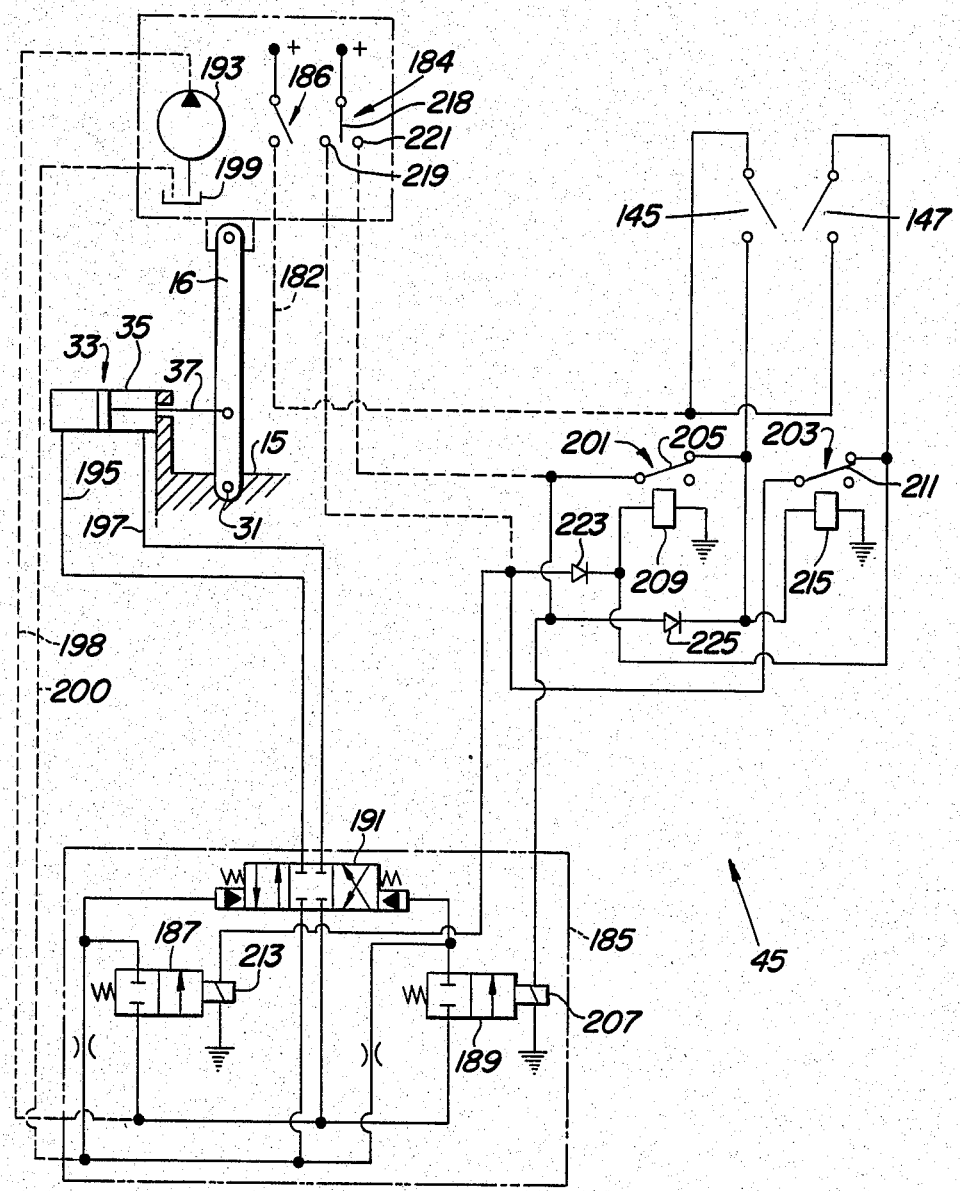
FIG. 8 is a circuit diagram of the guidance control circuit of the row crop guidance system shown in FIG. 1.

Reference is now made to FIG. 8 which shows a circuit diagram of guidance control circuit 45 which controls the operation of hydraulic cylinder 33 connected to harvester tongue 16 responsive to row crop sensing units 41, 43 or to a manual override switch 184. Circuit 45 includes normally open, left and right sensor switches 145, 147 which are mounted, respectively, in sensing units 41, 43. One side of switches 145, 147 is connected to a power source via line 182 and an on-off switch 186. Switch 145, 147 are positioned to be opened and closed responsive to movement of arms 47, 48. Circuit 45 includes a conventional control value 185 for operating cylinder 33 responsive to signals from sensor switches 145, 147. Control valve 191 is designed for connection to a closed center hydraulic system of the tractor used for towing the harvester. Also, it may be modified (through conventional means not shown) for use with an open center hydraulic system. Control valve 185 includes a right, solenoid operated, pilot valve 187 and a left, solenoid operated, pilot valve 189 which are operatively connected to pilot operated, four way, three position valve 191 for retracting cylinder 33 to shift harvester 11 to the right and for extending cylinder 33 to shift harvester 11 to the left respectively. Valve 191 is in turn connected to double acting cylinder 33 via lines 195, 197. Pilot valves 187, 189 and pilot operated value 191 are connected to a hydraulic pump 193 of the tractor used to tow the harvester via line 198. Oil is returned to a reservoir 199 of the towing tractor from cylinder 33 via pilot valves 187, 189 and pilot operated valve 191 through line 200.

To prevent the simultaneous generation of signals from both switches 145, 147, a pair of relays 201, 203 are connected in circuit with switches 145, 147 and control valve 185. Relay 201 includes (1) a normally closed switch 205 connected between one side of switch 145 and a solenoid 207 of pilot valve 189 and (2) a relay coil connected between ground and one side of switch 147. Relay 203 includes a (1) normally closed relay switch 211 connected between one side of switch 147 and a solenoid 213 of pilot valve 187 and (2) a relay coil 215 connected between ground and one side of switch 145. Closure of left sensor switch 145 sends an electrical signal through relay switch 201 to left pilot valve 189 to actuate control valve 185 and in turn hydraulic cylinder 33, and also energizes relay coil 215 opening normally closed relay switch 211. Energization of relay coil 215 opens the circuit path between right sensor switch 147 and pilot valve 187. Simarily, closure of right sensor switch 147 sends a signal through normally closed relay switch 211 to actuate pilot valve 187 to actuate in turn control valve 185 and hydraulic cylinder 133, and energizes relay coil 209 to open normally closed relay switch 205. Energization of relay coil 209 opens the circuit path between left sensor switch 145 and pilot valve 189. As will be apparent, closure of one of the sensor switches 145, 147 prevents the transmission of a signal from the other switch to the corresponding one of pilot valves 187, 189. During any time when both switches 145, 147 are closed, both relay switches 205, 211 are open and no signal is transmittable to control valve 185.

Guidance control circuit 45 further includes manual override switch 184 which generates a control signal for operation of hydraulic cylinder 33 which has priority over any contradictory signal generated automatically either by switch 145 or switch 147. Manual override switch 184 may be a single pole, double throw switch. The movable contact 218 of switch 184 is connected to a power source. One contact 219 of switch 184 is connected to solenoid 213 of right pilot valve 187 and the other contact 221 of switch 184 is connected to solenoid 207 of left pilot valve 189. Contact 219 of switch 184 is also connected via a diode 223 to relay coil 209 for opening normally closed relay switch 205 connected in circuit with switch 145. Contact 221 of switch 184 is connected via diode 225 to relay coil 215 for opening normally closed relay switch 211 connected in circuit with switch 147.

As may be seen if the operator wishes to move the harvester to the right by closure of switch 184 to contact 219 an automatically generated contradictory signal from switch 145 is prohibited from being transmitted to pilot valve 189 by the opening of normally closed relay switch 205. Similarly, if the operator desires to move the harvester to the left by closure of switch 184 to contact 221 an automatically generated contradictory signal from switch 147 is prohibited from being transmitted to pilot valve 187 by the opening of normally closed relay switch 211.

Thus, through relays 201, 203 operable by automatic sensor switches 145, 147 and by manual override switch 184, the generation of contradictory signals by switches 145, 147 is prohibited, manual switch 184 has priority over sensor switches 145, 147 irrespective of their position and again contradictory signals from manual switch 184 and one of sensor switches 145, 147 is prohibited. It is clear these functions are accomplished in a reliable, simplified manner.

VII. OPERATION

In summary, guidance system 13 operates by the engagement of a crop stalk 18 with one of the crop engaging arms 47, 48. Assuming arm 47 is engaged by stalk 18, arm 47 is rotated clockwise (FIG. 1) to in turn rotate actuator plate 95 clockwise (FIG. 2) to close normally open sensor switch 145. Referring to FIG. 8, closure of switch 145 generates an electrical signal which is transmitted through normally closed relay switch 205 to solenoid 207 of pilot valve 189. Solenoid 207 is actuated to close the normally open pilot valve 189. Closure of valve 189 shifts pilot operated valve 191 to the left in FIG. 8. The shifting of valve 191 to the left connects the closed end of hydraulic cylinder 33 to pump 193 to extend the piston rod 37 from housing 35 which moves tongue 16 clockwise and shifts harvester 11 to the left. Return oil flow from cylinder 33 is transmitted through lines 197, 200 to reservoir 199.

Closure of switch 145 energizes relay coil 215 to open normally closed relay switch 211. The opening of the relay switch 211 prevents a second, contradictory signal from switch 147 from being transmitted to pilot valve 187 simultaneously with the transmission of a signal from switch 145 to pilot valve 189. During the period when both switches 145, 147 are closed, no signal is transmittable to control valve 185.

Similarly, if switch 145 is in its normally open position and switch 147 is closed by a crop stalk 18 engaging crop engaging arm 48, a signal from switch 147 is transmitted to solenoid 213 of pilot valve 187 via normally closed relay switch 211. Pilot valve 187 is then shifted from its normally open position to a closed condition which in turn shifts pilot operated valve 191 to the right. This connects hydraulic pump 193 to the open or piston rod end of cylinder 33 and retracts piston rod 37 which shifts tongue 16 counterclockwise and shifts harvester 11 to the right. Return oil flow from cylinder 33 is transmitted through lines 195, 200 to reservoir 199. The closure of switch 147 also energizes coil 209 opening normally closed relay switch 205. This prevents a contradictory signal from switch 145 from being transmitted to pilot valve 189.

The operator through switch 184 always has the capability to manually override automatically generated signals from one or both of switches 145, 147 and thus may position harvester 11 without regard to the condition of switches 145, 147. This control function is important to initially position the harvester in alignment with crop rows to be harvested, to overcome spurious signals generated by weeds or other obstacles and to overrcome other conditions such as where the crop may not be in well defined rows in some portions of a field.

The invention herein has been explained in connection with certain preferred embodiments thereof. It will be appreciated by those skilled in the art that other variations and modifications of these preferred embodiments are possible. For example, row crop sensing units 41, 43 have been described only in connection with a pull type harvester. It will be appreciated that such units are equally applicable to headers used on self-propelled harvesters. In this instance, the sensing units will generate a mechanical signal which will be converted to an electrical signal for use in controlling an automatic steering system for the self-propelled harvester. Accordingly, it is intended that all such variations and modifications which are within the true spirit and scope of this invention be comprehended within the scope of the appended claims.

I claim:

1. In a row crop harvester including the combination of first and second laterally spaced crop dividers defining a crop-receiving passageway therebetween and each including first and second sidewalls, and a row crop sensing unit having a frame including a plate mounted to the first divider between the first and second sidewalls thereof, an arm support rotatably mounted to said plate, a crop-engaging arm mounted to the support for rotation therewith and a spring acting between the support and the frame and yieldably biasing the support to a normal position wherein it disposes the arm in a first position wherein it projects into the crop-receiving passageway, the improvement comprising: said plate having a slot formed therein; said arm support including a guide disposed within said slot for limiting the range of movement of the arm; and said guide including a shaft, and a shock-absorbing bushing mounted on the shaft and including inner and outer nonresilient liners sandwiching an intermediate resilient liner.

2. In a row crop harvester including the combination of first and second laterally spaced crop dividers defining a crop-receiving passageway therebetween and each including first and second sidewalls and a row crop sensing unit having a frame including a plate mounted to the first divider and extending between the first and second sidewalls thereof, an arm support rotatably mounted to said plate, a crop-engaging arm mounted to the arm support for rotation therewith and a spring acting between the support and the frame for biasing the support to a position wherein it holds the arm in a position extending into the crop-receiving passageway, the improvement comprising: said arm support including a shaft projecting upwardly through and being rotatably mounted in said plate; said spring being a coil torsion spring received on said shaft; a plate-like collar located beneath said plate and mounted for pivoting about said shaft; said plate containing an opening disposed arcuately about said shaft; said collar containing an opening disposed arcuately about said shaft; a first fastener projecting through the collar and located for free movement along said opening in said plate; a second fastener projecting through said plate into the arcuate opening in the collar and releasably securing said collar in a desired angular position about said shaft; said spring having a lower end secured to the first fastener and having an upper end secured to an upper end of said shaft.

3. The unit of claim 2 wherein said collar has a flange having an opening formed therein for receiving a tool to rotate said collar about said shaft and adjust the tension on said spring.

4. The row crop harvester defined in claim 2 and further including a switch-operating plate fixed to the upper end of the shaft; the upper end of said spring being anchored to said switch-operating plate and thereby secured to said shaft; and an electrical switch having an actuator located in a path traversed by said plate during rotation of said shaft for sensing movement of the arm caused by its engagement with crop in a row.

5. The row crop harvester defined in claim 4 wherein a housing is mounted to said plate in enclosing relationship to the upper end of said shaft and said switch; said housing including a floor received over the top of said shaft; said switch being mounted to said floor; and said housing further including a roof releasably mounted to said floor.

6. In a row crop harvester including the combination of first and second laterally spaced crop dividers defining a crop-receiving passageway therebetween and each including first and second sidewalls, and a row crop sensing unit having a frame mounted to the first divider between the first and second sidewalls thereof, a crop-engaging arm rotatably mounted to the frame for movement about an upright axis between a nondeflected first position wherein at least a portion of the arm projects a first distance away from the first divider into said passageway, and a deflected second position wherein said portion of the arm projects into said passageway a distance less than said first distance, and a spring connected for biasing said arm to its deflected position, the improvement, comprising: said arm, as considered in its first position and relative to a forward direction of travel of the harvester, including a leading end, which is angled outwardly and rearwardly from the first divider, an intermediate portion extending generally parallel to the direction of travel and a trailing end angled rearwardly and inwardly from the intermediate portion to a location between the first and second sidewalls of the first divider, whereby, contact of the leading end of the arm with crop stalks during forward harvester movement and contact of the trailing end of the arm with crop stalks during reverse harvester movement will both result in the arm being deflected toward its second position.

7. The harvester defined in claim 6 and further including a support bar extending beneath said trailing end of the crop-engaging bar and having a forward end fixed to said frame and a rearward end fixed to said divider, whereby the bar acts as a guard for preventing engagement of the trailing end with crop stalks passing beneath the first divider.

* * * * *